Pool's Improved Rotary Sod Cutter

116748　　PATENTED JUL 4 1871

Witnesses
Brock Johnson
A H Suplee Jr

Inventor
Josiah Pool
By his atty C N W Smith

UNITED STATES PATENT OFFICE.

JOSIAH POOL, OF RIO VISTA, CALIFORNIA.

IMPROVEMENT IN ROTARY SOD-CUTTERS.

Specification forming part of Letters Patent No. 116,748, dated July 4, 1871.

*To all whom it may concern:*

Be it known that I, JOSIAH POOL, of Rio Vista, in the county of Solano and State of California, have invented an Improved Rotary Sod-Cutter; and I do hereby declare that the following is a full and exact description of the same, reference being had to the accompanying drawing and to the letters of reference marked thereon.

This invention relates to that class of agricultural implements known as a sod-cutter, and is intended to be employed principally on tule lands; and consists, mainly, in the application of rotating disks upon a stationary axis, which is placed across a peculiarly-constructed frame-work, so that as the cutting-disks are sunk down to their greatest capacity the frame will act as a vehicle or carrier on the surface and thereby avoid much friction. Wheels are, however, provided for regulating the depth of the cutters, which turn on a crank-axle which is raised and lowered by a lever held in place by a toothed rack. A marking implement is attached to one side of the frame, the uses of which will hereinafter more fully appear.

Figure 1:
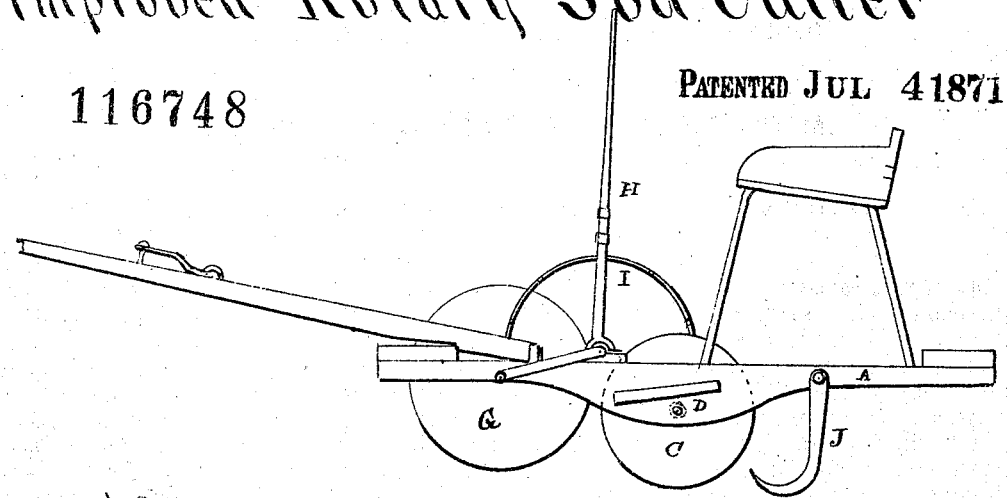
Figure 2:
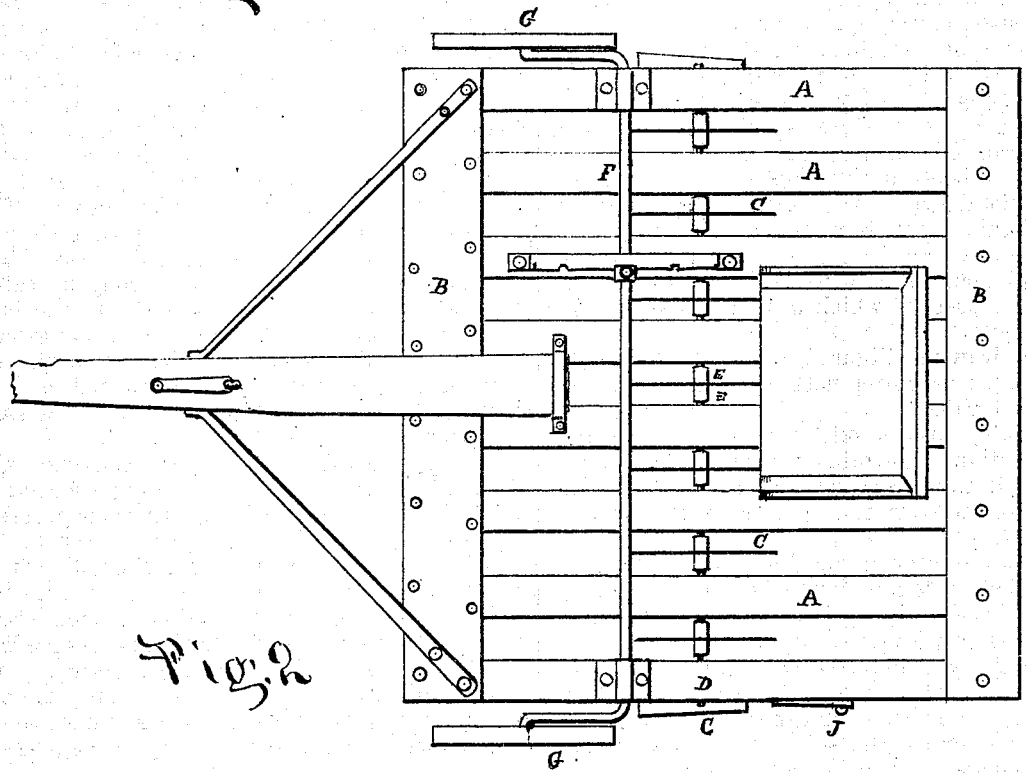

In the drawing, Figure 1 represents a side elevation of my invention with one wheel removed. Fig. 2 is a plan.

To enable others skilled in the art to which my invention appertains to make and use the same, I will now proceed to describe fully my improved device with the appliances for carrying it into effect.

It is a well-known fact that much valuable land, called "tule land," now lies idle and unproductive for lack of proper implements with which to break it up, pulverize it, and fit it for the seed; and especially is this the case in California, in the tule bottoms, where the roots are large and fresh, and intertwine with each other, rendering it impossible to break the soil without first cutting and crosscutting them, so that the plow or harrow can be made to penetrate their depths and turn them up with the sod to the sun. The design, then, of this invention, is to provide an implement to so prepare the tule lands that the plow or harrow may be brought into requisition to fit the soil for seeds.

A A are the longitudinal parts of the frame, which are placed parallel with each other and held in position by cross-end beams B B, to which they are bolted. The center of the lower faces of these bars A is rounded off and made smooth, having a considerable depth, so that but little bearing-surface and friction are had when the frame is weighted down to the ground. The cutters C C rotate between these bars upon a stationary steel axis, D, which passes transversely through the enlarged portion. The cutters are provided with hubs or naves E, which support and prevent them from moving laterally. In front of the cutters or disks on the top of the frame is placed a crank-axle, F, having its bearings on the end beams, and provided with wheels G G for transporting the machine from place to place, and raising the cutters from the ground and regulating their cutting-depth, which is accomplished by operating the lever H on the crank-axle at the right hand of the driver's seat, which is kept in position by a dog on the lever entering the teeth of the circular rack I. This lever may be made movable on the axle, and held in place by a set-screw. At the side of the frame is a movable implement, which may be called "a marker," J, which, when the machine is in operation, is allowed to drag upon the ground and indicate the extent or width which the machine has cut, so that the operator will not unwittingly go over the ground again in the same direction.

This device will be found very convenient, as without it a difficulty would be experienced, as the disks make but small marks in their progress.

With an operator in the driver's seat of two hundred pounds' weight the disks will cut six inches deep; and in operating the machine it is only necessary to simply raise the driving-wheels by working the lever and driving across the field lengthwise and at right angles, observing the mark made by the marking-hook until the necessary cutting is had, when a plow may be employed, which will easily turn up the segregated sod. In many instances the plow may be dispensed with entirely, and only a harrow be employed to pulverize and fit the soil after my machine has passed over the ground.

Having thus described my invention, I am well aware that a patent was granted to one Silas A. Moody for a sod-cutter, October 16, 1866, having a series of circular blades or disks upon a shaft or axle, in the operation of which great difficulty was experienced in turning with the machine, for the reason that the disks were rigidly attached to the shaft, and the blades would bend or break in the absence of hubs or naves as supports laterally. That device I do not claim. I do not claim, either, the employment of a pair of lifting-wheels upon a crank-axle operated by a lever; but What I do claim as new in my improved machine, and desire to secure by Letters Patent, is—

In a sod-cutter provided with a series of rotating disks, the series of beams A having curved bearing-surfaces, as and for the purpose described.

In witness whereof I have hereunto set my hand and seal.

JOSIAH POOL. [L. S.]

Witnesses:
C. W. M. SMITH,
H. S. TIBBEY.